United States Patent
Dang et al.

(10) Patent No.: US 11,831,101 B2
(45) Date of Patent: Nov. 28, 2023

(54) FINE ALIGNMENT ADAPTER FOR A CONNECTOR

(71) Applicant: Dell Products L.P., Round Rock, TX (US)

(72) Inventors: Matthew Dang, Austin, TX (US); Eduardo Escamilla, Round Rock, TX (US); Robert G. Bassman, Dalton, MA (US)

(73) Assignee: Dell Products L.P., Round Rock, TX (US)

( * ) Notice: Subject to any disclaimer, the term of this patent is extended or adjusted under 35 U.S.C. 154(b) by 43 days.

(21) Appl. No.: 17/568,832

(22) Filed: Jan. 5, 2022

(65) Prior Publication Data

US 2023/0216244 A1 Jul. 6, 2023

(51) Int. Cl.
*H01R 13/631* (2006.01)
*H01R 13/506* (2006.01)
*H01R 12/72* (2011.01)

(52) U.S. Cl.
CPC ......... *H01R 13/631* (2013.01); *H01R 13/506* (2013.01); *H01R 12/72* (2013.01)

(58) Field of Classification Search
None
See application file for complete search history.

(56) References Cited

U.S. PATENT DOCUMENTS

| | | | | |
|---|---|---|---|---|
| 4,406,511 A | * | 9/1983 | Hayes | H01R 12/00 439/449 |
| 5,286,217 A | * | 2/1994 | Liu | H01R 12/7011 439/326 |
| 6,358,079 B1 | * | 3/2002 | Noble | H01R 12/7005 439/328 |
| 6,361,343 B1 | * | 3/2002 | Daskalakis | G06F 1/186 439/371 |
| 8,187,031 B2 | * | 5/2012 | Li | H01R 12/737 439/567 |
| 9,373,906 B2 | * | 6/2016 | Yamazaki | H01R 13/56 |
| 9,515,399 B2 | | 12/2016 | Jimenez, III et al. | |
| 2008/0101051 A1 | | 5/2008 | Middleton et al. | |

* cited by examiner

*Primary Examiner* — Oscar C Jimenez
(74) *Attorney, Agent, or Firm* — Larson Newman, LLP (57) ABSTRACT

An alignment adapter is to be placed in physical communication with a connector of an information handling system. The alignment adapter includes an insert portion and a support wall. The insert portion is to be placed within the connector, and to provide a proper alignment of a device board within the connector. The support wall is to be placed in physical communication with an outside edge of the connector. The support wall is a particular distance from the insert portion. A chamfer of the connector is to be placed within the particular distance the support wall is from the insert portion when the insert portion is fully inserted within the connector.

17 Claims, 7 Drawing Sheets

FINE ALIGNMENT ADAPTER FOR A CONNECTOR

FIELD OF THE DISCLOSURE

The present disclosure generally relates to information handling systems, and more particularly relates to a fine alignment adaptor for a connector in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An alignment adapter is to be placed in physical communication with a connector of an information handling system. The alignment adapter includes an insert portion and a support wall. The insert portion is to be placed within the connector, and may provide a proper alignment of a device board within the connector. The support wall is to be placed in physical communication with an outside edge of the connector. The support wall is a particular distance from the insert portion. A chamfer of the connector may be placed within the particular distance the support wall is from the insert portion when the insert portion is fully inserted within the connector.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
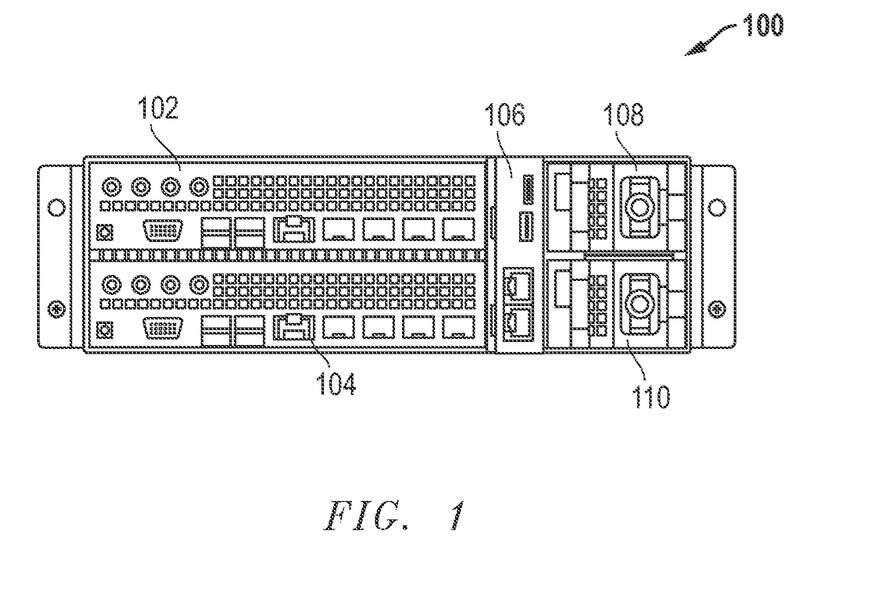
FIG. 1 is a view of an information handling system according to at least one embodiment of the disclosure.

FIG. 1 illustrates a server or information handling system 100 according to at least one embodiment of the disclosure. For purpose of this disclosure information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price.

Server 100 may be configured with any suitable number of components or devices, such as components 102, 104, and 106, and with power supply units 108 and 110. In an example, power supply units 108 and 110 may be inserted from the same edge of server 100, and the power outputs of the power supply units may be on the same side of the server as the power ports of the devices. In an example, each of power supply units 108 and 110 may be inserted within respective bays of server 100 and may be plugged into corresponding connectors. In certain examples, the connectors may provide signal pins and power pins to enable power supply units 108 and 110 to communication with and provide power to components 102, 104, and 106 of server 100.

Figure 2:
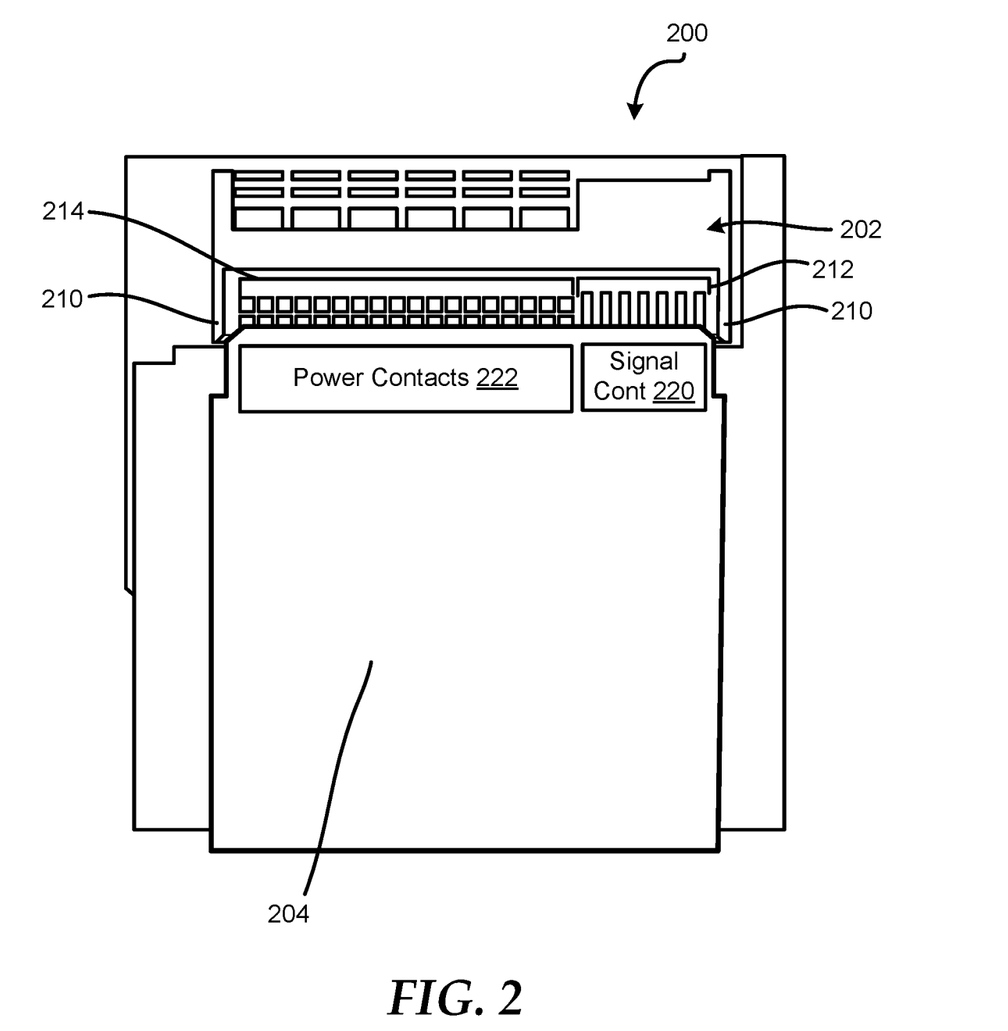
FIG. 2 is a view of a power supply board interfacing with a connector of an information handling system according to at least one embodiment of the present disclosure.

Power supplies 108 and 110 may supply different power amounts, such as five hundred Watts, one thousand one hundred Watts, two thousand Watts, or the like. In an example, power supplies having different power ratings may also have different size connectors. For example, a power supply with a higher power rating may utilize a wider card to interface with a connector of server 100 as compared to a power supply within a lower power rating. In this example, connectors of bays within server 100 may be sized to fit the wider card, as illustrated in FIG. 2. However, when a power supply with a smaller card is inserted within a bay the smaller card may be improperly aligned with the connector of the bay as illustrated in FIG. 3.

FIG. 2 illustrates a portion of an information handling system 200 including a connector 202 and a power supply board 204 according to at least one embodiment of the present disclosure. Connector 202 includes chamfers 210, signal contacts 212, and power contacts 214. A top portion of connector 202 has been removed in FIG. 2 to enable signal contacts 212 and power contacts 214 to be visible. Power supply board 204 includes signal contacts 220 and power contacts 222. In an example, chamfers 210 may interface with the edges of power supply board 204 to provide fine alignment between the power supply board and connector 202. For example, chamfers 210 may be utilized to align signal contacts 210 of connector 202 with signal contacts 220 of power supply board 204, and to align power contacts 214 of the connector with power contacts 222 of the power supply board.

Figure 3:
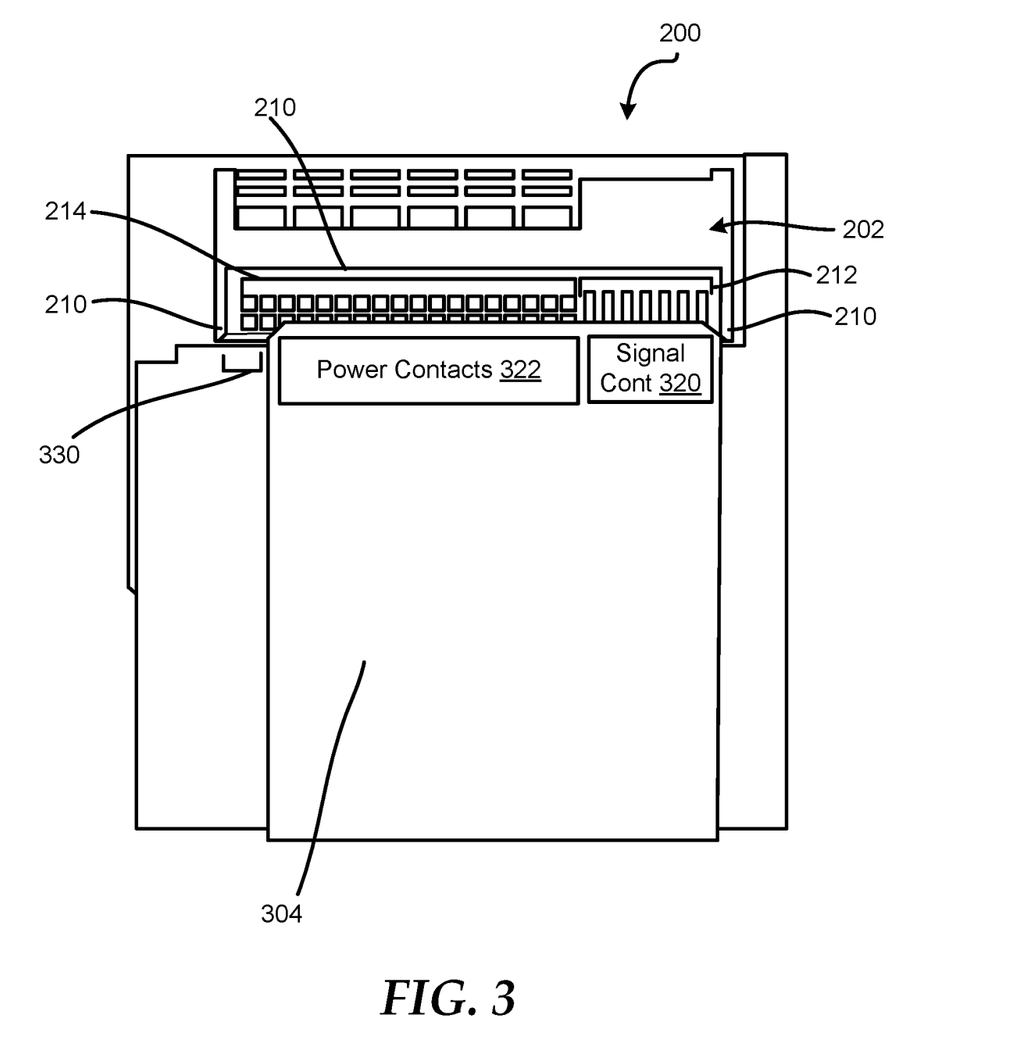
FIG. 3 is a view of another power supply board interfacing with the connector of the information handling system according to at least one embodiment of the present disclosure.

FIG. 3 illustrates a power supply board 304 to interface with connector 202 of information handling system 200 according to at least one embodiment of the present disclosure. Power supply board 304 includes signal contacts 320 and power contacts 322. In an example, the width of power supply board 304 may be less than a width of connector 202, such that the power supply board may not be in physical communication with both chamfers 210 of the connector at the same time. For example, the width of power supply board 304 may be a particular amount 330 less than connector 210. In this example, if a right edge of power supply board 304 is in physical communication with right chamfer 210, signal contacts 210 of connector 202 may align with signal contacts 220 of power supply board 204, and power contacts 214 of the connector may align with power contacts 222 of the power supply board. However, if a left edge of power supply board 304 is in physical communication with left chamfer 210, signal contacts 210 of connector 202 may not properly align with signal contacts 220 of power supply board 204, and power contacts 214 of the connector may not properly align with power contacts 222 of the power supply board. In an example, an alignment adapter, such as alignment adapter 404 in FIGS. 4-8, may be utilized to properly align signal contacts 210 of connector 202 with signal contacts 220 of power supply board 204, and to align power contacts 214 of the connector with power contacts 222 of the power supply board.

Figure 4:
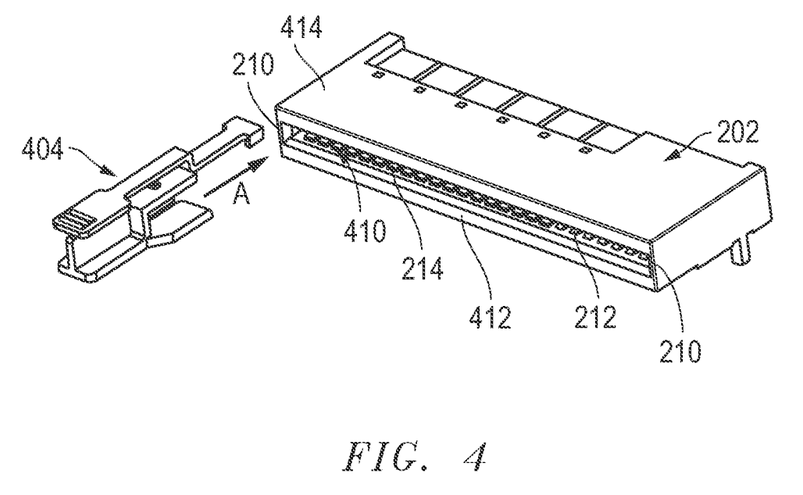
FIG. 4 is a perspective view of a fine alignment adapter and the connector according to at least one embodiment of the present disclosure.
Figure 5:
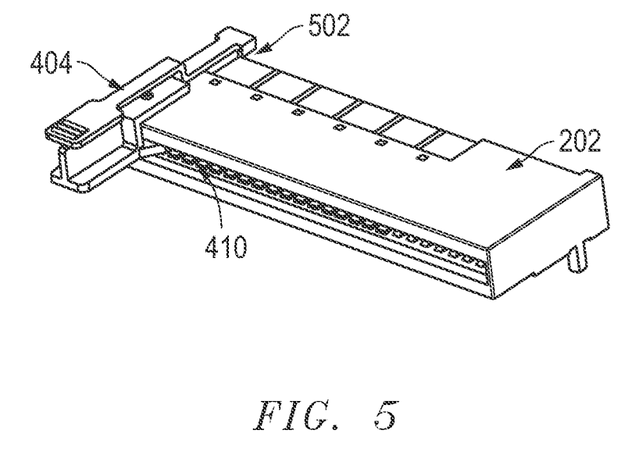
FIG. 5 is a perspective view of the fine alignment adapter inserted within the connector according to at least one embodiment of the present disclosure.

FIGS. 4 and 5 illustrate different connection stages between alignment adapter 404 and connector 202 according to at least one embodiment of the present disclosure. Referring to FIG. 4, connector 202 includes a gap 410 to enable alignment adapter 404 to be inserted within the connector. In an example, signal contacts 212 and power contacts 214 may be located on a bottom portion 412 of connector 202. Gap 410 may be formed by chamfers 210, bottom portion 412, and a top portion 414 of connector 202. Alignment adapter 404 may be pushed toward connector 202 in the direction of arrow A, and may interface with left chamfer 210 when placed in physical communication with the connector as shown in FIG. 5.

Referring to FIG. 5, when alignment adapter 404 is fully inserted within connector 202 a portion of the alignment adapter 404 may snap fit over a rear edge 502 of the connector. In an example, alignment adapter 404 may fit within gap 410 of connector 202 and secured to the connector by snap fitting over rear edge 502. When alignment adapter 404 is inserted within gap 410 of connector 202, the alignment adapter may be utilized to properly align power supply board 304 of FIG. 3, with the connector as will be described below.

Figure 6:
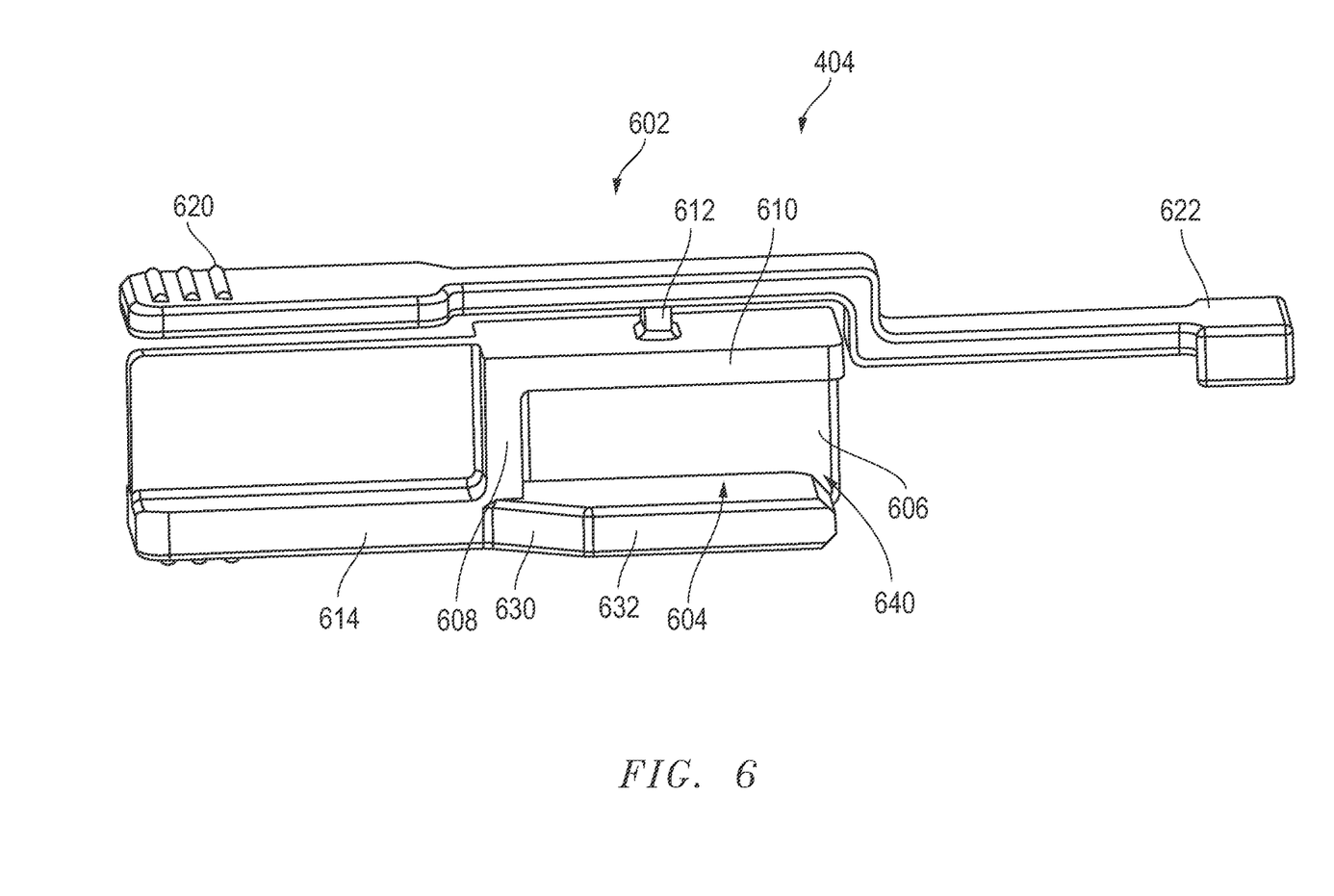
FIGS. 6 and 7 are different perspective views of the fine alignment adapter according to at least one embodiment of the present disclosure.
Figure 7:
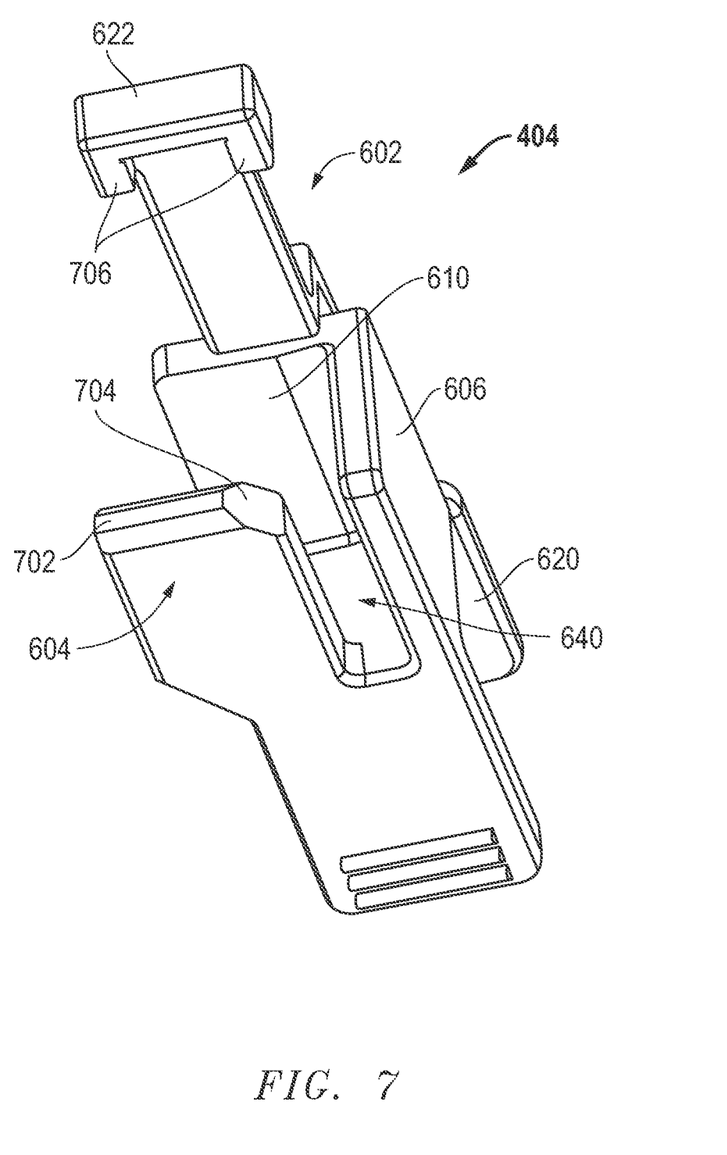

FIGS. 6 and 7 illustrate alignment adapter 404 according to at least one embodiment of the present disclosure. Alignment adapter 404 includes a latching arm 602, an insert portion 604, a support wall 606, a stop wall 608, a top support 610, a pivot portion 612, and a first alignment portion 614. Latching arm 602 includes ends 620 and 622. Insert portion 604 includes an alignment ramp 630 and an insert edge 632. Alignment adapter 404 includes a gap 640 between insert portion 604 and support wall 606. In an example, gap 640 may be substantially equal to a width of chamfer 210 of connector 202.

As shown in FIG. 6, pivot portion 612 is in physical communication with both top portion 610 and latching arm 602. In an example, pivot portion 612 may enable latching arm 602 to pivot and ends 620 and 622 to move up and down based on a force exerted on one of the ends. For example, if a force is exerted on end 620 in the direction of arrow B, latching arm 602 may pivot at the point pivot portion 612 is in physical communication with the latching arm and end 622 may move upward in the direction of arrow C. In certain examples, end 620 may move a particular amount in the direction of arrow B and end 622 may move a corresponding amount in the direction of arrow C.

Referring to FIG. 7, insert portion 604 also includes a front edge 702 and a guide ramp portion 704. As shown, insert portion 604 to tapers toward front edge 702. End 622 of latching arm 604 includes a latch portion 706. In an example, as alignment adapter 404 is moved toward connector 202 in the direction of arrow A, as shown in FIG. 4, latch portion 706 of end 622 may be the first part of the alignment adapter to move near the connector. In certain examples, a rest position of latching arm 604 may place latch portion 706 in a location that the latch portion may interfere with insert portion 604 from being placed within gap 410 of connector 202. In this example, an individual may exert a force on end 620 in the direction of arrow B, as shown in FIG. 6. In response to the force on end 620, end 622 may move in the direction of arrow C, as shown in FIG. 6, which in turn may enable latch portion 706 of end 622 to clear top portion 414 of connector 202 so that insert portion 604 may be placed within gap 410 of the connector as the latch portion slides along the connector 414 to snap fit around rear edge 502 of the connector as shown in FIG. 5.

In an example, an individual may exert a force on end 620 in the direction of arrow B, as shown in FIG. 6. In response to the force on end 620, end 622 may move in the direction of arrow C, as shown in FIG. 6, which in turn may enable latch portion 706 of end 622 to clear top portion 414 of connector 202 so that alignment adapter 404 may be removed from the connector.

In an example, the tapered shape of front edge 702 combined with guide ramp portion 704 may enable insert portion 604 to align with gap 410 of connector 202 in FIG. 4. For example, if insert portion 604 is slightly misaligned with gap 410, top or bottom angled portions of front edge 702 may guide the insert portion up or down to align with the gap. Guide ramp portion 704 may correct alignment of insert portion 604 with gap 410 in a direction perpendicular to the alignment provided by front edge 702. In an example, if gap 640 is not properly aligned with chamfer 210 of connector 202, the chamfer may slide along guide ramp portion 704 until the chamfer is aligned within the gap of alignment adapter 404 as shown in FIG. 8.

Figure 8:
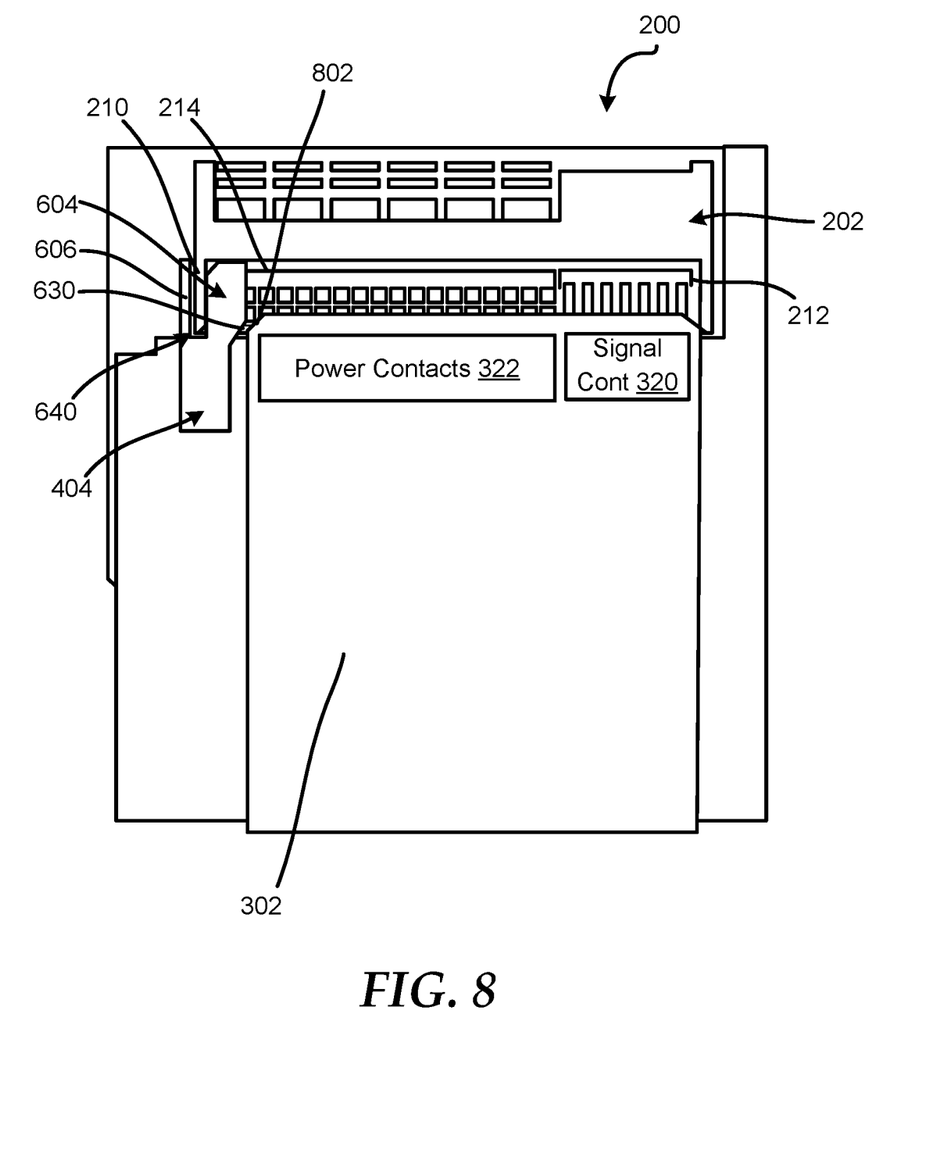
FIG. 8 is a view of a power supply board interfacing with the fine alignment adapter, and with the connector of the information handling system according to at least one embodiment of the present disclosure.

FIG. 8 illustrates power supply board 304 interfacing with fine alignment adapter 404 and with connector 202 of information handling system 200 according to at least one embodiment of the present disclosure. In an example, alignment adapter 404 may be fully inserted within connector 202 as described above with respect to FIGS. 6 and 7. When the alignment adapter 404 is in physical communication with connector 202, chamfer 210 of the connector may be located within gap 640 formed by insert portion 604 and support wall 606. In certain examples, gap 640 may be any suitable size, such as substantially equal to the width of chamfer 210, and the gap may enable a proper alignment of alignment adapter 404 with connector 202.

As power supply board 304 is being inserted within connector 202, an angled portion 802 of the power supply board may interface with alignment ramp 630 of alignment adapter 404 to provide fine alignment of the power supply board within the connector. In an example, the width of insert portion 604 may be any suitable width, such as the width of amount 330, shown in FIG. 3, between power supply board 304 and left chamfer 210. In this example, when power supply board 304 is inserted within connector 202, the width of insert portion 604 may enable proper alignment of signal contacts 212 of the connector with signal contacts 320 on the power supply board and proper alignment of power contacts 214 of the connector with power contacts 322 on the power supply board.

While FIGS. 2-8 have been discussed with respect to power supply boards 204 and 304 and connector 202, one of ordinary skill in the art would recognize that alignment adapter 404 may be utilized with any suitable device with an edge card or board to interface with a connector, such as device board needing all of the pins to have proper alignment with pins of the connector. In an example, alignment adapter 404 may ensure proper pin alignment between device boards and a connector when the connector does not include a built in alignment key.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An alignment adapter to be placed in physical communication with a connector of an information handling system, the alignment adapter comprising:
   an insert portion to be placed within the connector, the insert portion to provide a proper alignment of a device board within the connector;
   a support wall to be placed in physical communication with an outside edge of the connector, the support wall being a particular distance from the insert portion, wherein a chamfer of the connector is to be placed within the particular distance that the support wall is from the insert portion when the insert portion is fully inserted within the connector;
   a latching arm including first and second ends, the second end including a latch portion to snap fit over a back portion of the connecter when the alignment adapter is fully insert within the connector;
   a top portion extending substantially parallel with the insert portion; and
   a pivot portion in physical communication with both the top portion and the latching arm, wherein the pivot portion enables the first and second ends of the latching arm to move up and down based on a force exerted on one of the first and second ends.

2. The alignment adapter of claim 1, wherein a force exerted down on the first end of the latching arm causes the second end of the latching arm to move up.

3. The alignment adapter of claim 1, wherein a width of the insert portion is substantially equal to an amount that the device board is short of a width of the connector.

4. The alignment adapter of claim 1, wherein the proper alignment of the device board and the connector aligns signal contacts of the device board with signal contacts of the connector, and aligns power contacts of the device board with power contacts of the connector.

5. The alignment adapter of claim 1, wherein the insert portion includes:
   a front edge including a tapered portion, wherein the tapered portion of the front edge provides alignment of the alignment adapter with the connector in a first direction.

6. The alignment adapter of claim 5, wherein the insert portion includes:
   a guide ramp portion to provide alignment of the alignment adapter with the connector in a second direction.

7. An information handling system comprising:
   a connector including a chamfer, the connector to provide power to components of the information handling system;
   a device board to be placed in physical communication with the connector; and
   an alignment adapter including:
      an insert portion to be placed within the connector, the insert portion to provide a proper alignment of the device board within the connector;
      a support wall to be placed in physical communication with an outside edge of the connector, the support wall being a particular distance from the insert portion, wherein the chamfer of the connector is to be placed within the particular distance the support wall is from the insert portion when the insert portion is fully inserted within the connector;
      a latching arm including first and second ends, the second end including a latch portion to snap fit over a back portion of the connecter when the alignment adapter is fully insert within the connector;
      a top portion extending substantially parallel with the insert portion; and
      a pivot portion in physical communication with both the top portion and the latching arm, wherein the pivot portion enables the first and second ends of the latching arm to move up and down based on a force exerted on one of the first and second ends.

8. The information handling system of claim 7, wherein the alignment adapter further comprises:
   a latching arm including first and second ends, the second end includes a latch portion to snap fit over a back portion of the connecter when the alignment adapter is fully insert within the connector.

9. The information handling system of claim 8, wherein the alignment adapter further comprises:

a top portion extending substantially parallel with the insert portion; and a pivot portion in physical communication with both the top portion and the latching arm, wherein the pivot portion enables the first and second ends of the latching arm to move up and down based on a force exerted on one of the first and second ends.

10. The information handling system of claim 8, wherein a force exerted down on the first end of the latching arm causes the second end of the latching arm to move up.

11. The information handling system of claim 7, wherein a width of the insert portion is substantially equal to an amount that the device board is short of a width of the connector.

12. The information handling system of claim 7, wherein the proper alignment of the device board and the connector aligns signal contacts of the device board with signal contacts of the connector, and aligns power contacts of the device board with power contacts of the connector.

13. The information handling system of claim 7, wherein the alignment adapter further comprises a front edge including a tapered portion, wherein the tapered portion of the front edge provides alignment of the alignment adapter with the connector in a first direction.

14. The information handling system of claim 13, wherein the alignment adapter further comprises a guide ramp portion to provide alignment of the alignment adapter with the connector in a second direction.

15. An information handling system comprising:

a connector to provide power to components of the information handling system;

a power supply including a device board to be placed in physical communication with the connector and to provide the power to the connector; and an alignment adapter including:

an insert portion to be placed within the connector, the insert portion to provide a proper alignment of the device board within the connector;

a support wall to be placed in physical communication with an outside edge of the connector, the support wall being a particular distance from the insert portion, wherein a chamfer of the connector is to be placed within the particular distance that the support wall is from the insert portion when the insert portion is fully inserted within the connector;

a latching arm including first and second ends, the second end including a latch portion to snap fit over a back portion of the connecter when the alignment adapter is fully insert within the connector;

a top portion extending substantially parallel with the insert portion; and a pivot portion in physical communication with both the top portion and the latching arm, wherein the pivot portion enables the first and second ends of the latching arm to move up and down based on a force exerted on one of the first and second ends.

16. The information handling system of claim 15, wherein a width of the insert portion is substantially equal to an amount that the device board is short of a width of the connector.

17. The information handling system of claim 15, wherein the proper alignment of the device board and the connector aligns signal contacts of the device board with signal contacts of the connector, and aligns power contacts of the device board with power contacts of the connector.

\* \* \* \* \*